US008141237B1

(12) United States Patent
Wei et al.

(10) Patent No.: US 8,141,237 B1
(45) Date of Patent: Mar. 27, 2012

(54) FLEXIBLE PRINTED CIRCUIT CONNECTOR ASSEMBLING FIXTURE

(75) Inventors: Tsung-han Wei, Tu Cheng (TW); Feng-chi Lee, Tu Cheng (TW); Kuo-chuan Chiu, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 21 days.

(21) Appl. No.: 12/916,531

(22) Filed: Oct. 30, 2010

(51) Int. Cl.
*B23P 19/00* (2006.01)

(52) U.S. Cl. ................ 29/739; 29/747; 29/748; 29/749; 29/750; 269/903

(58) Field of Classification Search .................... 29/729, 29/739–742, 830–836; 269/13, 21, 25, 47, 269/760, 903; 439/495, 701, 949
See application file for complete search history.

(56) References Cited

U.S. PATENT DOCUMENTS

| | | | | |
|---|---|---|---|---|
| 5,327,641 | A * | 7/1994 | Olsson | 29/747 |
| 5,549,485 | A * | 8/1996 | Chishima et al. | 439/495 |
| 6,164,636 | A * | 12/2000 | Taylor | 269/287 |
| 6,206,352 | B1 * | 3/2001 | Ishitani et al. | 269/13 |
| 6,378,857 | B1 * | 4/2002 | Taylor | 269/47 |
| 7,107,672 | B2 * | 9/2006 | Onitsuka et al. | 29/832 |

* cited by examiner

*Primary Examiner* — Minh Trinh
(74) *Attorney, Agent, or Firm* — Cheng-Ju Chiang

(57) ABSTRACT

A flexible printed circuit (FPC) connector assembling fixture is provided for assembling an FPC connector. The assembling fixture includes a base that is set horizontally. A lower slidable carriage is slidably coupled to the base. Upper and lower molds are respectively and rotatably coupled to an upper slidable carriage and the lower slidable carriage. A terminal fitting mechanism and a cover mounting mechanism are respectively mounted to the upper and lower molds. Guide posts are mounted to the base. The upper mold is slidably coupled to the base with the guide posts. The lower mold forms an accommodation chamber. The cover mounting mechanism includes a push rod and first and second slide channels. The second slide channel is in communication with the accommodation chamber and the first slide channel. The push rod is received in and slidably coupled to the second slide channel.

11 Claims, 7 Drawing Sheets

810

FLEXIBLE PRINTED CIRCUIT CONNECTOR ASSEMBLING FIXTURE

BACKGROUND OF THE INVENTION

1. Field of the Invention

The present invention generally relates to a connector assembling fixture, and in particular to an assembling fixture for an FPC (Flexible Printed Circuit) connector that connects a flexible printed circuit board.

2. The Related Arts

Recently, with the progressive and continuous development of science and technology, living standards of human beings have been greatly improved and electronic products that play an important role in human society are getting diversified. Electronic products that are compact and miniaturized and of fashions are now prevailing and attract great attention of general consumers. This provides a guide for the development of electronic products toward compactness, functionality, and integration. To meet the needs for "better compactness" and "less weight", electronic products must be configured in such a way that a great number of components are arranged in an extremely dense manner. One of the feasible measures for realizing such an extremely dense arrangement of electronic components is the use of flexible printed circuits (FPCs), which are of excellent flexibility for easy arrangement to thereby facilitate realization of electronic products being light-weighted, compact, and miniaturized and also allow for integration of components and wiring in electronic products. An FPC connector functions to connect a flexible printed circuit to wiring or circuit boards of component assemblies.

Referring to FIGS. 11 and 12, an FPC (flexible printed circuit) connector 20 comprises an insulation housing 21, a cover 23, and a plurality of conductive terminals 22. The insulation housing 21 has a front side forming an insertion opening 24 that receives a flexible circuit board to insert therein. The insulation housing 21 forms terminal slots 25, and the conductive terminals 22 are respectively received and retained in the terminal slots 25. The cover 23 forms pivots 26 for rotatably coupling with the insulation housing 21. The insulation housing 21 forms pivot recesses 27 corresponding to the pivots 26 of the cover 23. The pivots 26 of the cover 23 are rotatably received and retained in the pivot recess 27. The conductive terminals 22 that are received and retained in the insulation housing 21 have front ends holding the pivots 26 in position thereby retaining the cover 23 on the insulation housing 21. Rotation of the pivots 26 allows the cover 23 to move relative to the insulation housing 21 to an open condition (as shown in FIG. 11) or a closed condition (as shown in FIG. 12). With the cover 23 in the open condition, a flexible substrate (not shown) is allowed to insert into the connector and then the cover 23 can be rotate to close. The rotation of the cover 23 to the closed condition drives the flexible substrate on which circuit patterns are printed to form an FPC to tightly engage the conductive terminals 22, thereby realizing electrical engagement between the conductive terminals 22 and the FPC.

Assembling the FPC connector 20 is carried out by first assembling the cover 23 to the insulation housing 21, and then, with the cover 23 opened, sequentially inserting the terminals 22 and forcibly depressing the terminals 22 so that front ends of the terminals extending into the insulation housing 21 engages and holds the pivots 26 of the cover 23 to retain the cover 23 on the insulation housing 21. As such, the assembling of the FPC connector 20 is completed.

However, the key issue of the assembling operation of the FPC connector is to assemble the cover and to maintain the cover in the open condition for assembling the terminals and this is the tough part of the assembling operation. Currently, such operations are performed manually. Manual assembling of FPC connectors suffers poor precision, intense human labor required, poor assembling efficiency, and poor consistency of quality of the FPC connectors so manually assembled, which leads to poor product passing rate. Apparently, the conventional way of assembling does not meet the needs of compactness, high functionality, and intense integration of modern electronic products.

SUMMARY OF THE INVENTION

To overcome the above discussed drawbacks of the conventional technique, the present invention aims to provide an FPC connector assembling fixture, which helps improving assembling efficiency, reducing labor required, and maintaining consistent high quality and product precision of the assembled product.

To achieve the above objective, according to the present invention, an FPC connector assembling fixture is provided for assembling a cover and conductive terminals to an insulation housing of an FPC connector. The assembling fixture comprises a base, guide posts, an upper slidable carriage, a lower slidable carriage, an upper mold, a lower mold, a cover mounting mechanism, and a terminal fitting mechanism. The base is set horizontally. The lower slidable carriage is slidably coupled to the base. The lower mold is rotatably coupled to the lower slidable carriage. The cover mounting mechanism is mounted to the lower mold. The guide posts have lower ends mounted to the base and upper ends slidably extending through the upper slidable carriage. The upper mold is mounted, in a vertical direction, to a bottom of the upper slidable carriage. The terminal fitting mechanism is mounted to the upper mold. The lower mold forms an accommodation chamber, in which the insulation housing is received and retained. The cover mounting mechanism comprises a push rod and a first slide channel and a second slide channel formed in the lower mold. The first slide channel and the second slide channel are formed in directions that are substantially perpendicular to each other. The second slide channel is in communication with the accommodation chamber and the first slide channel. The push rod is received in and slidably coupled to the second slide channel. The push rod is slidable in a direction that is substantially perpendicular to a sliding direction of the terminal fitting mechanism.

In summary, in assembling an FPC connector with the FPC connector assembling fixture according to the present invention, the insulation housing is securely set in the accommodation chamber, the cover is caused to slide through the first slide channel into the second slide channel, the push rod conveys the cover into the accommodation chamber to be assembled to the insulation housing, the terminal depression slide moves downward in a depression direction that is substantially normal to the conveying direction in which the push rod conveys the cover, keeps the cover in an open condition to allow the conductive terminals to be successively fit into the insulation housing, and then the terminal depression slide is set in alignment with the conductive terminals for forcing the terminals deeply into the insulation housing to have ends of the terminals engage and hold the pivots of the cover, thereby completing stable and reliable assembling of the FPC connector. The FPC connector assembling fixture according to the present invention helps improving operation efficiency and reducing labor costs. Meanwhile, the products assembled in this way show consistent quality and high precision.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF PREFERRED EMBODIMENTS

Figure 1:
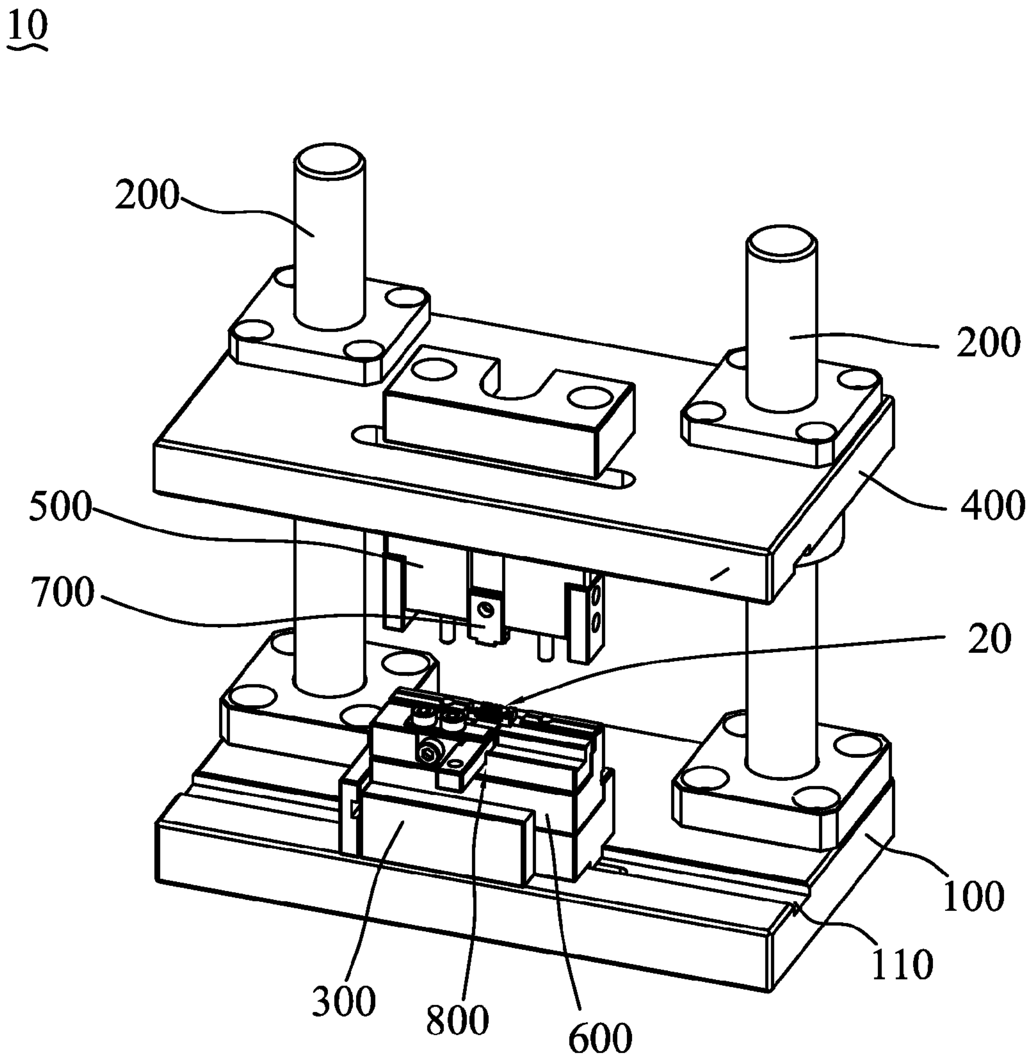
FIG. 1 is a perspective view showing an FPC (Flexible Printed Circuit) connector assembling fixture according to the present invention.

With reference to the drawings and in particular to FIG. 1, an FPC connector assembling fixture constructed in accordance with the present invention, generally designated at 10, is used to assemble an FPC connector 20 that is constructed for connection with a flexible printed circuit board by respectively assembling a cover 23 and conductive terminals 22 to an insulation housing 21 of the FPC connector 20. According to an embodiment of the present invention, the FPC connector assembling fixture 10 comprises a base 100, guide posts 200, a lower slidable carriage 300, an upper slidable carriage 400, an upper mold 500, a lower mold 600, a terminal fitting mechanism, and a cover mounting mechanism 800. The base 100 is set horizontally. The lower slidable carriage 300 is slidably coupled to the base 100. The lower mold 600 is rotatably coupled to the lower slidable carriage 300. The cover mounting mechanism 800 is mounted on the lower mold 600. The base 100 supports the guide posts 200, preferably two such posts, thereon in such a way that lower ends of the guide posts 200 are mounted to the base 100. Opposite upper ends of the guide posts 200 are set to slidably extend through the upper slidable carriage 400. The upper mold 500 is mounted, in a vertical direction, to a bottom of the upper slidable carriage 400. The terminal fitting mechanism is mounted on the upper mold 500.

Figure 2:
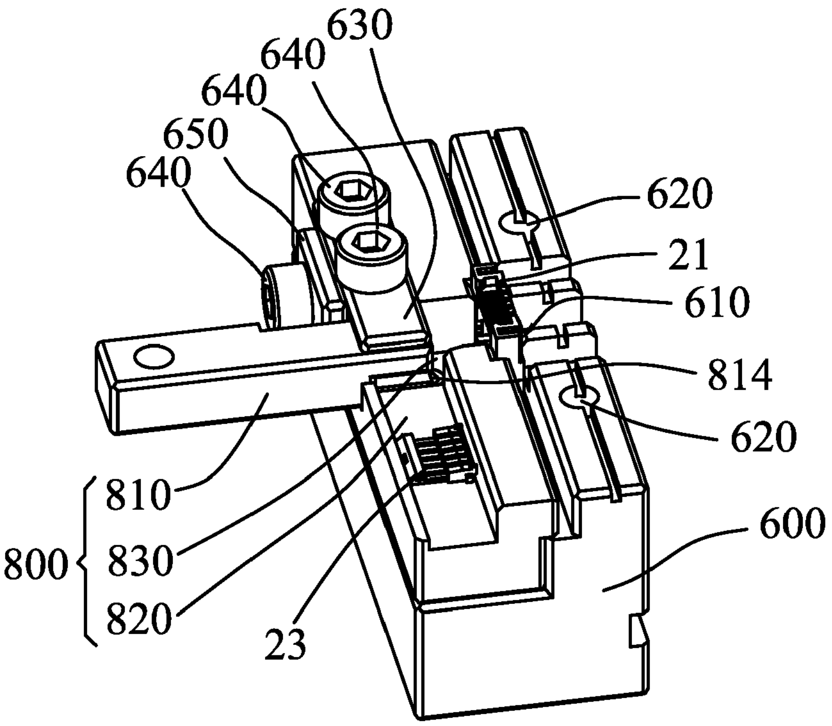
FIG. 2 is a perspective view showing a cover mounting mechanism shown in FIG. 1 mounted to a lower mold according to the present invention.
Figure 3:
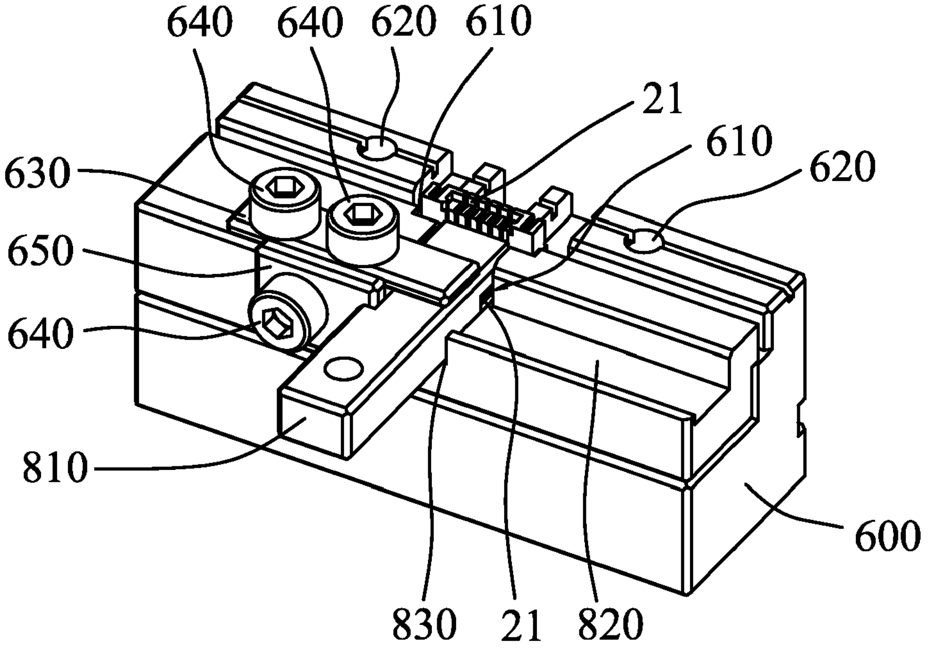
FIG. 3 is another perspective view of FIG. 2.
Figure 9:
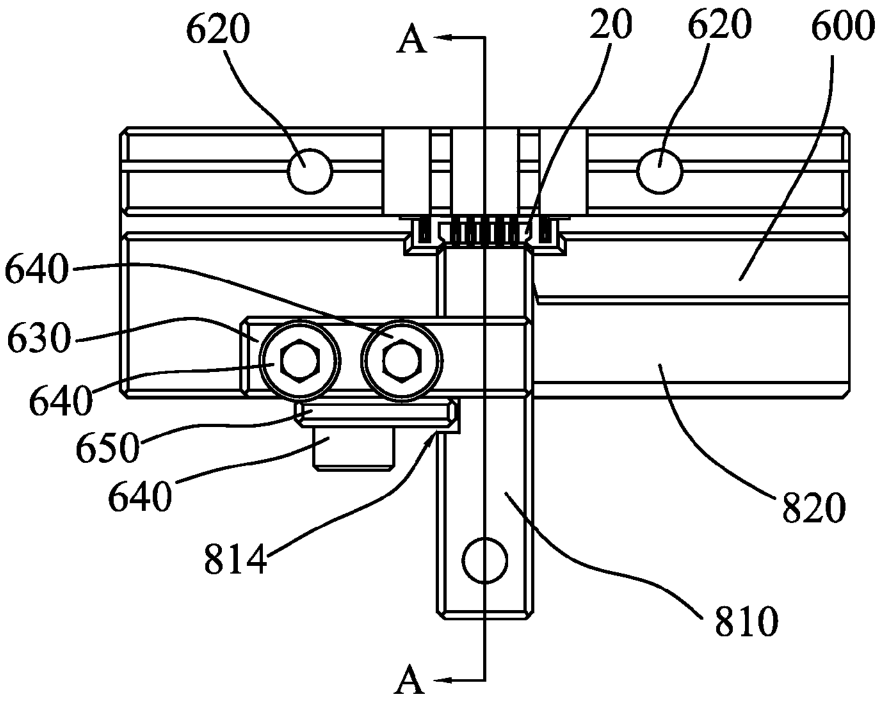
FIG. 9 is a top plan view showing a condition of a lower mold to which a cover mounting mechanism according to the present invention is mounted after terminals have been fit into the insulation housing.

Referring to FIGS. 2, 3 and 9, the lower mold 600 forms an accommodation chamber 610 that is complementary to the insulation housing 21 of the FPC connector 20, whereby an insulation housing 21 to be assembled is receivable in the accommodation chamber 610. The cover mounting mechanism 800 comprises a push rod 810 and a first slide channel 820 and a second slide channel 830 formed in the lower mold 600. The first slide channel 820 is substantially parallel to the accommodation chamber 610, while the second slide channel 830 is substantially perpendicular to the accommodation chamber 610. The second slide channel 830 is in communication with both the accommodation chamber 610 and the first slide channel 820. The push rod 810 is slidably received in the second slide channel 830. The lower mold 600 comprises a first retention board 650 and a second retention board 630. The first retention board 650 has an end that is fixed by a bolt 640 to the lower mold 600 and an opposite end extending into the second slide channel 830 to engage the push rod 810. The second retention board 630 has an end fixed by bolts 640 to the lower mold 600 and an opposite end projecting above the second slide channel 830 to engage an upper surface of the push rod 810 that is located in the second slide channel 830. The first retention board 650 and the second retention board 630 are substantially perpendicular to each other. Through constraint of movement of the push rod 80 imposed by the first retention board 650, the push rod 810 is confined to do linear movement within a predetermined range inside the second slide channel 830, whereby undesired separation of the push rod 810 and the lower mold 600 is prevented. The second retention board 630 helps maintaining stable linear movement of the push rod 810 sliding in second slide channel 830 for realizing precise alignment and assembling. Preferably, the lower mold 600 forms two positioning holes 620 in an upper surface thereof. The two positioning holes 620 are located on opposite sides of the accommodation chamber 610 for aligning the upper mold 500 for guiding purposes.

Figure 4:
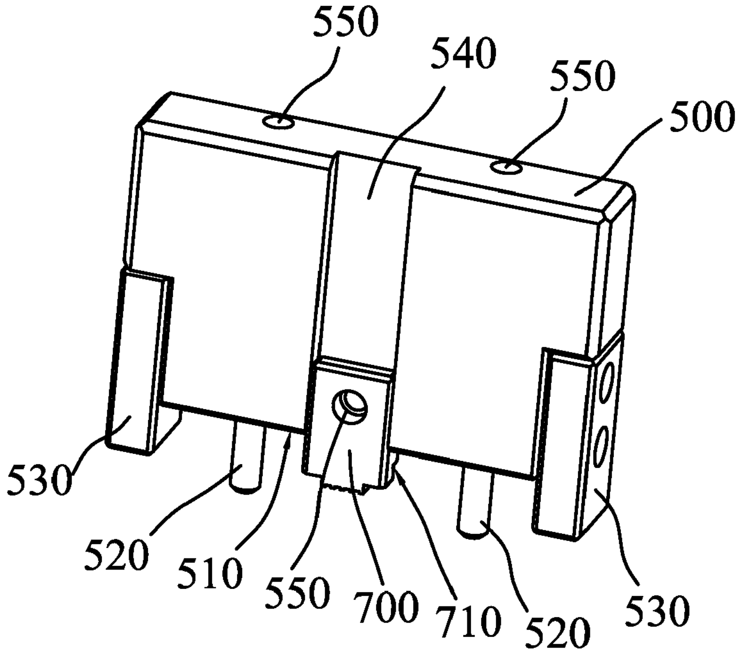
FIG. 4 is a perspective view showing a terminal fitting mechanism of FIG. 1 mounted to an upper mold according to the present invention.

Referring to FIG. 4, the terminal fitting mechanism comprises a terminal depression slide 700. The upper mold 500 has a lower end forming a reference surface 510 that is substantially parallel to an upper surface of the base, whereby at the time when the terminal depression slide 700 is depressing down the conductive terminals 22, the reference surface 510 is opposing an FPC connector 20 to be assembled set in the lower mold 600. The upper mold 500 forms a slide channel 540, which will be referred to as "fourth slide channel" for easy description, two positioning bars 520, and two positioning blocks 530. The two positioning blocks 530 are rectangular parallelepipeds that are respectively mounted to opposite sides of the upper mold 500. The positioning block 530 has an end fixed to the upper mold 500 and an opposite end projecting beyond the reference surface 510 for being brought into engagement with the lower mold 600. The fourth slide channel 540 is defined in a central portion of the upper mold 500 in a direction substantially normal to the plane where the base 100 is located. Mounting holes 550 are defined in the terminal depression slide 700 and inside the fourth slide channel 540 to correspond to each other. The terminal depression slide 700 is slidably received in the fourth slide channel 540, and is coupled to the upper mold 500 at the location corresponding to the mounting hole 550 defined in the fourth slide channel 540. Thus, the terminal depression slide 700 has an end coupled to the upper mold 500, while an opposite end projects beyond the reference surface 510. The two positioning bars 520 functions for precise alignment of the upper mold 500 with respect to the lower mold 600. The two positioning bars 520 project beyond the reference surface 510 and are respectively located between the terminal depression slide 700 and the positioning blocks 530. The positioning bars 520 have a projection length that is greater than the distances that the terminal depression slide 700 and the positioning blocks 530 project beyond the reference surface 510. When the upper slidable carriage 400 move downward, causing the terminal depression slide 700 to depress the conductive terminals 22 downward into the FPC connector 20, the two positioning bars 520 are respectively set in alignment with and extend into the two positioning holes 620 to provide guidance for the downward depression of the terminal depression slide 700 so as to ensure that the terminal depression slide 700 is always located exactly above the conductive terminals 22 that are located within the accommodation chamber 610. The terminal depression slide 700 has a lower end forming a depression engagement section 710 corresponding to the conductive terminals 22 that currently projects from the insulation housing 21 to be assembled. The depression engagement section 710 shows a stepped configuration for mating the conductive terminals 22 in depressing the terminals 22 so as to properly engage and drive the conductive terminals 22 into the insulation housing 21.

Figure 5:
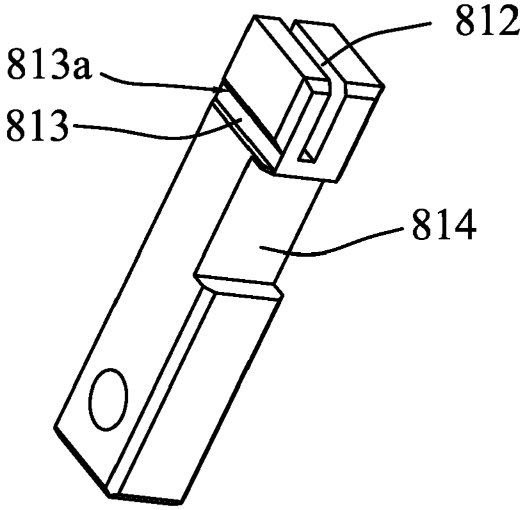
FIG. 5 is a perspective view showing a push rod shown in FIGS. 2 and 3.
Figure 10:
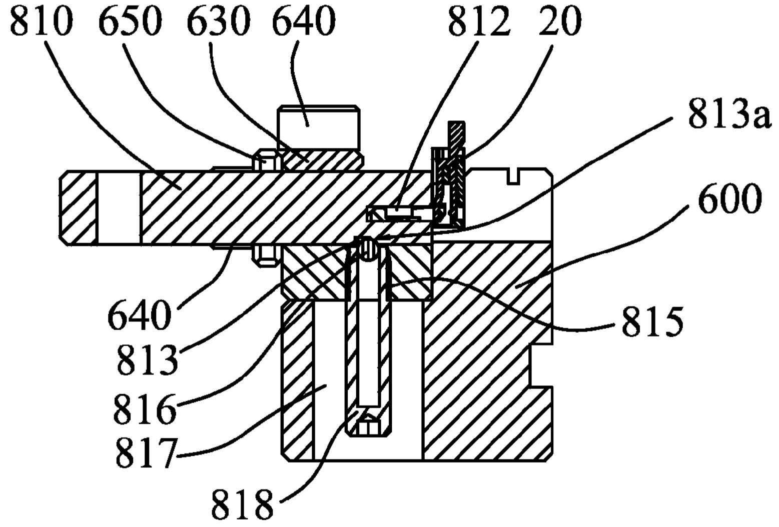
FIG. 10 is a cross-sectional view taken along line A-A of FIG. 9.
Figure 11:
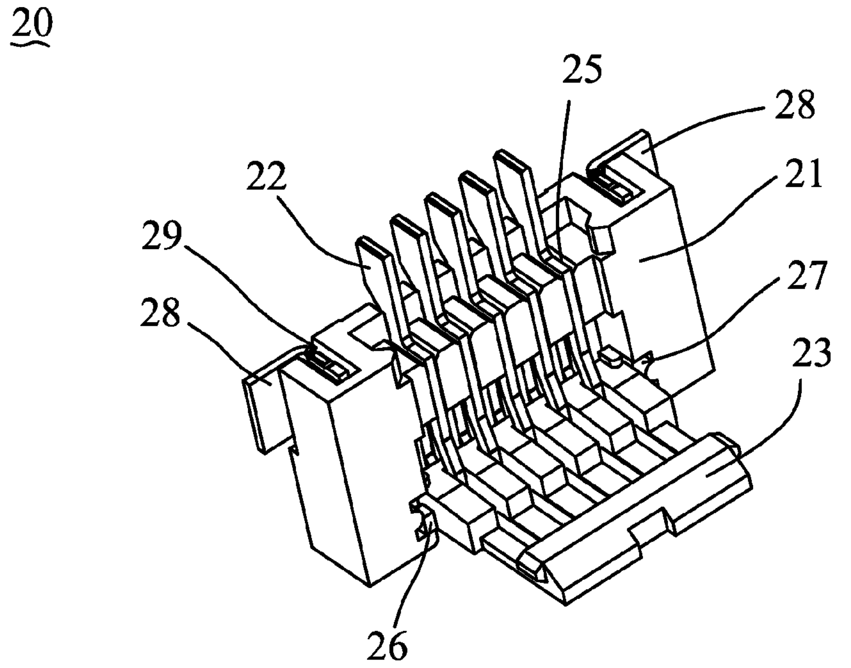
FIG. 11 (Prior Art)
FIG. 11 is a perspective view showing an FPC connector of prior art that is assembled with the FPC connector assembling fixture according to the present invention shown in FIG. 1, a cover of the connector being in an open condition.
Figure 12:
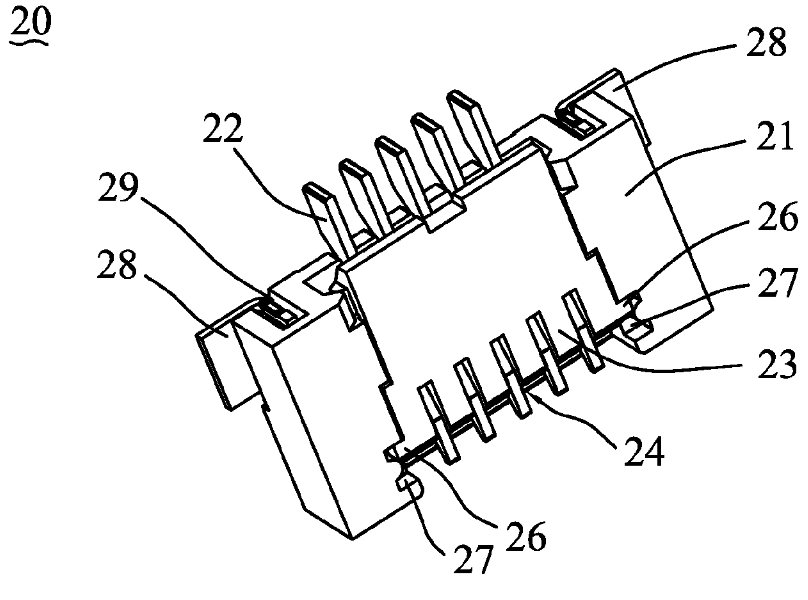
FIG. 12 (Prior Art)
FIG. 12 is a perspective view showing an FPC connector of prior art that is assembled with the FPC connector assembling fixture according to the present invention shown in FIG. 1, the connector being in a completely assembled condition.

Referring to FIGS. 5 and 10, the push rod 810 of the cover mounting mechanism 800 has an inner end that opposes the insulation housing 21 located in the accommodation chamber 610 and forms a holding slot 812 substantially on the same horizontal plane as the first slide channel 820. The cover 23 slides through the first slide channel 820 into and retained by the holding slot 812 with an end of the cover 23 projecting outside the push rod 810. The push rod 810 forms a first groove 813 in a bottom close to the inner end. Further, the push rod 810 forms a second groove 814 in a side wall thereof in such a way that the second groove 814 is engageable with the first retention board 650 of the lower mold 600. The first groove 813 faces the second slide channel 830. The first groove 813 has a side wall 813*a* that is close to the accommodation chamber 610 and forms a slanted surface. The second slide channel 830 forms a circular recess 815 in a bottom thereof and the circular recess 815 has an opening that receives and retains therein a positioning sphere 816, whereby the first groove 813 is engageable with the positioning sphere 816. When the first groove 813 is in engagement with the positioning sphere 816, the push rod 810 is positioned such that the push rod 810 conveys the cover 23 into the insulation housing 21 to have the cover 23 assembled to the insulation housing 21. Through the mating engagement between the positioning sphere 816 and the first groove 813, the push rod 810 can have a precise moving distance with respect to the insulation housing 21 so as to eliminate the potential risk of excessive compression of the insulation housing 21, which leads to damage of the cover 23 and the insulation housing 21, in the process of the push rod 810 conveying the cover 23.

Preferably, as shown in FIG. 10, fixing of the positioning sphere 816 can be realized through the formation of a circular bore 817 in the lower mold 600. The circular bore 817 forms an opening in the bottom of the lower mold 600 and is in communication with the circular recess 815. The circular recess 815 forms threading. The circular bore 817 receives therein a hollow cylinder 818 that engages the circular recess 815. The cylinder 818 has an end forming a threading structure that is set in threading engagement with the circular recess 815, and the positioning sphere 816 is retained in an opening formed in an end of the cylinder 818 that engages the circular recess 815. Through the threading engagement between the cylinder 818 and the circular recess 815, the distance that the positioning sphere 816 projects beyond the bottom surface of the second slide channel 830 can be adjusted, making the positioning sphere 816 better engageable with the push rod 810.

Figure 6:
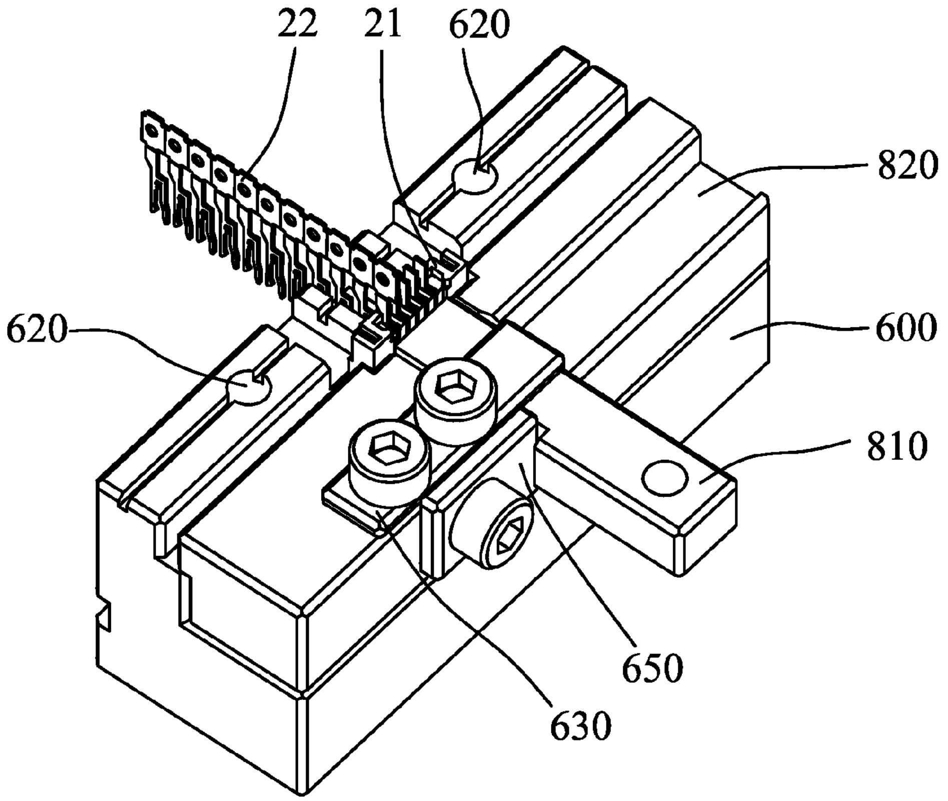
FIG. 6 is a perspective view illustrating positioning of conductive terminals into an insulation housing received in an accommodation chamber of the FPC connector assembling fixture according to the present invention.
Figure 7:
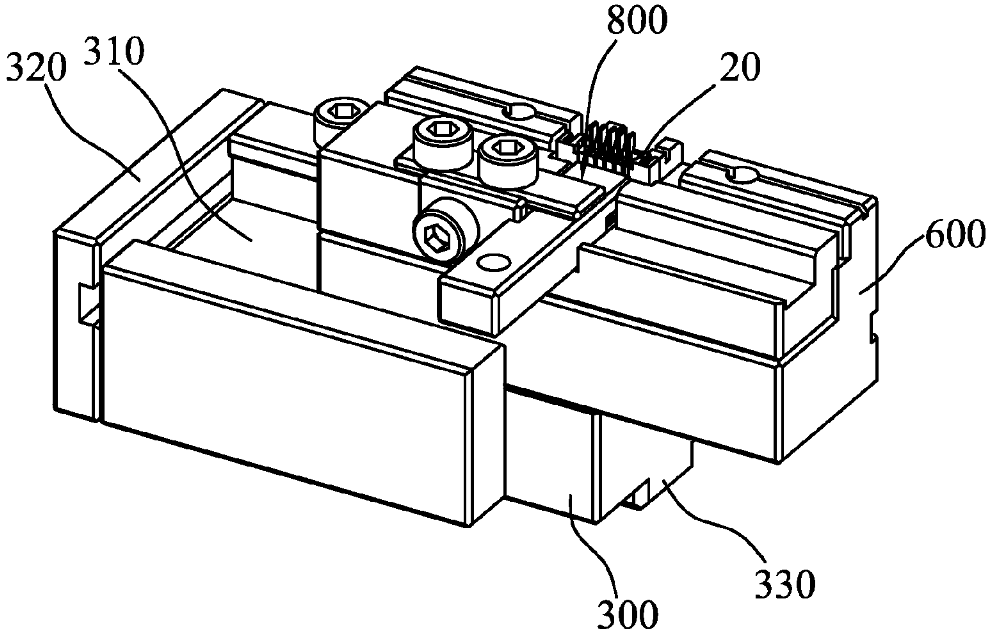
FIG. 7 is a perspective view showing a lower mold mounted to a lower slidable carriage of the FPC connector assembling fixture according to the present invention.

Referring to FIGS. 6 and 7, as well as FIG. 1, the lower slidable carriage 300 forms a third slide channel 310 corresponding and mating the lower mold 600. The third slide channel 310 is substantially parallel to the first slide channel 820. The lower mold 600 is slidably received in the third slide channel 310. The lower slidable carriage 300 comprises a stop block 320 fixed an end of the third slide channel 310. The lower mold 600 is engageable with the stop block 320 with a leading end thereof in a sliding direction. The lower slidable carriage 300 comprises a slide rib 330 projecting from the bottom of the lower slidable carriage 300 for slidably coupling with the base 100. The slide rib 330 forms mounting holes for coupling with the base 100. When the cover 23 has been assembled to the insulation housing 21, with the conductive terminals 22 being properly positioned into the terminal slots 25 of the insulation housing 21, the lower mold 600 is carried by the lower slidable carriage 300 to allow the lower slidable carriage 300 conveys the lower mold 600 along the third slide channel 310 to the next operation station.

Figure 8:
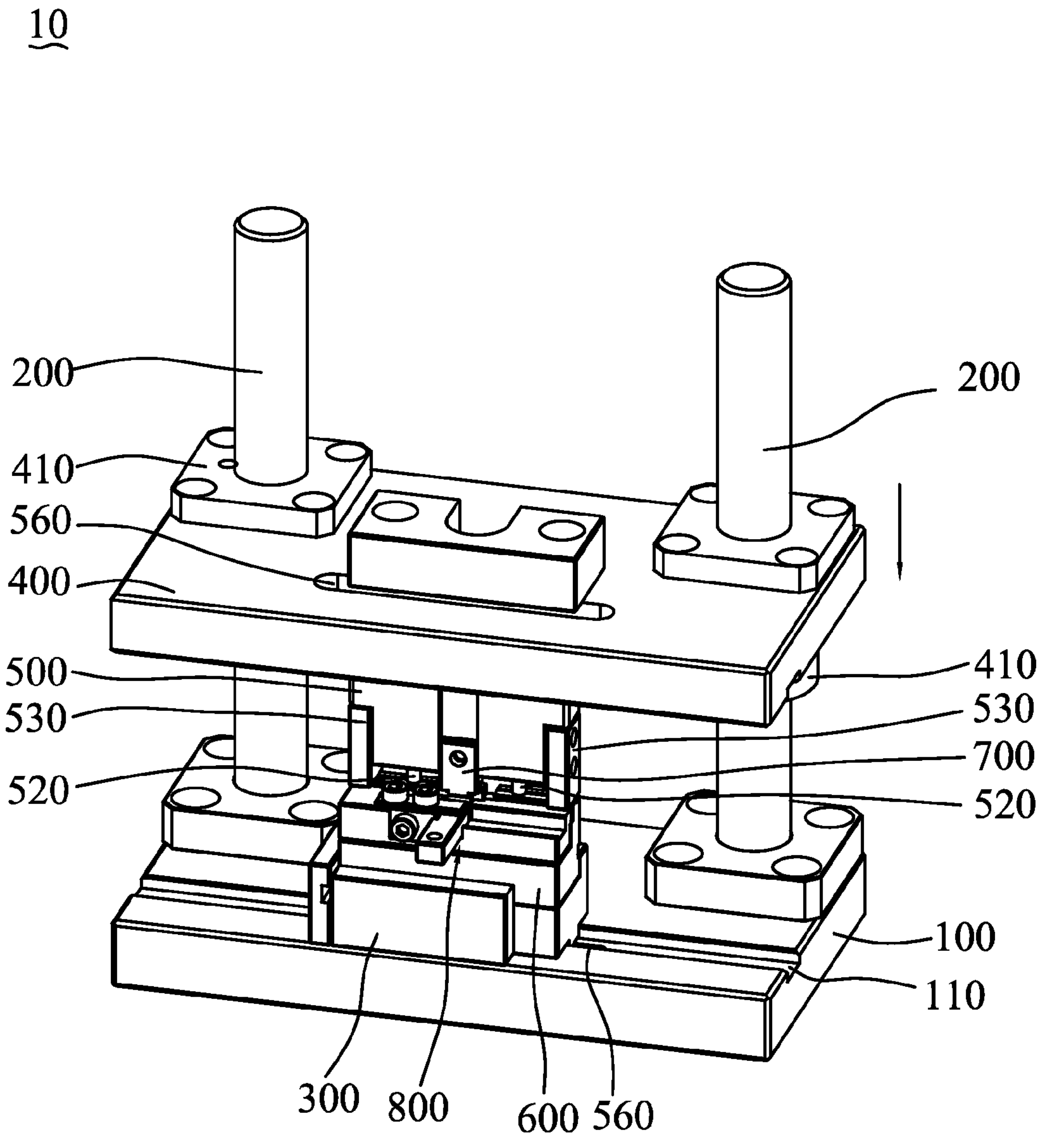
FIG. 8 is a perspective view similar to FIG. 1 but showing the FPC connector assembling fixture according to the present invention in another condition.

Referring to FIGS. 4 and 8, the upper slidable carriage 400 comprises bearings 410 mounted to opposite side portions thereof corresponding to the two guide posts 200. Through the mating arrangement between the bearings 410 and the guide posts 200, the upper slidable carriage 400 is allowed to do ascending and descending movement in a direction substantially normal to the base 100. The sliding direction of the push rod 810 is substantially normal to the sliding direction of the terminal depression slide 700, whereby the conductive terminals 2 can be assembled with the cover 23 in the open condition. The upper slidable carriage 400 forms therethrough a mounting slot 560, whereby the upper mold 500 can be fixed to the upper slidable carriage 400 through the mounting holes 550 defined in the upper mold 500 and the mounting slot 560 formed in the upper slidable carriage 400. In an embodiment of the present invention, coupling between the mounting slot 560 and the mounting holes 550 can be realized with bolts or other fasteners.

In a practical application, the FPC connector 20 in assembling further comprises retainers 28. Thus, an additional operation of assembling the retainers 28 to the connector is needed. According to the present invention, the FPC connector assembling fixture 10 further comprises a retainer fitting mechanism (not shown). The operation that is carried out with the FPC connector assembling fixture 10 for assembling the conductive terminals 22 constitutes an operation station, while the operation of assembling the retainers forms another operation station. Both operation stations are set on the base 100. The operation station associated with the retainer fitting mechanism is similar to that associated with the assembling of the conductive terminals, and the retainer fitting mechanism and the terminal fitting mechanism are located on the same line. Preferably, the base 100 forms a linear fifth slide channel 110 along a line aligning the terminal fitting mechanism and the retainer fitting mechanism. The fifth slide channel 110 engages the slide rib 330 formed on the bottom of the lower slidable carriage 300, whereby the lower slidable carriage 300 is slidably coupled to the fifth slide channel 110 of the base 100. The fifth slide channel 110 forms, in portions thereof corresponding to the terminal fitting mechanism and the retainer fitting mechanism, mounting slots 560 corresponding to the mounting holes 550 defined in the slide rib 330, whereby through selective engagement of fasteners with the mounting slots 560 and the mounting holes 550, the lower slidable carriage 300 can be selectively and releasably fixed to the base 100 to selectively and alternately set the FPC connector 20 to be assembled located in the accommodation chamber 610 in alignment with the terminal fitting mechanism and the retainer fitting mechanism. After the assembling of the conductive terminals 22 of the FPC connector 20, the lower slidable carriage 300 slides to a position corresponding to the retainer fitting mechanism. The assembling operations of the terminals 22 and the retainers 28 are carried out in a module-shared manner in order to eliminate unnecessary waste of operation time in loading and unloading products. However, what is different from the terminal fitting mechanism is that the retainer fitting mechanism is of a form of slidable block that is mounted to an upper mold 500 associated with the retainer fitting mechanism and the slidable block forms thereon a depression engagement section that is made and arranged to correspond to the retainers 28, whereby through downward depression performed by the slidable block, the retainers 28 are forced to fit into corresponding slots 29.

The assembling operation of an FPC connector performed with the FPC connector assembling fixture 10 according to the present invention will be described. The insulation housing 21 is positioned, in a vertically oriented manner, into the accommodation chamber 610 so that the direction along which the conductive terminals 22 are to be inserted faces upward and an end of the housing to which the cover 23 is pivotally coupled faces the second slide channel 830, as shown in FIG. 2. A cover 23 is loaded into the first slide channel 820 in such a way that the end of the cover 23 carrying the pivots 26 is located close to the accommodation chamber 610. Afterwards, the push rod 810 is moved in a direction away from the accommodation chamber 610 and then, the cover 23 is moved into the holding slot 812 formed in the inner end of the push rod 810. Under this condition, the end of the cover 23 that carries the pivots 26 is located outside the push rod 810. By moving the push rod 810 in a reversed direction, the cover 23 is conveyed into the accommodation chamber 610 to have the pivots 26 formed at the end of the cover 23 fit into the pivot recesses 27 defined in the insulation housing 21. After the push rod 810 has conveyed the cover 23 to complete the assembling thereof, due to the engagement between the first groove 813 and the positioning sphere 816, the cover 23 is kept in the open condition.

Afterwards, conductive terminals 22 are sequentially put into the terminal slots 25 of the FPC connector 20, this step being carried out manually. The conductive terminals 22 comprise a carrier band and a shearing mechanism (not shown) is employed to remove the carrier band. As shown in FIG. 7, the lower mold 600 is slidably received into the lower slidable carriage 300, and is caused to position against the left end, so that the left end of the lower mold 600 engages the stop block 320. With the lower mold 600 so mounted to the lower slidable carriage 300, the lower slidable carriage 300 is driven to have the slide rib 330 on the bottom of the lower slidable carriage 300 to slide along the fifth slide channel 110 to a location below the terminal depression slide 700, where the lower slidable carriage 300 is releasably fastened to the mounting slot 560 of the base 100 to which the terminal depression slide 700 corresponds.

The slidable coupling between the upper slidable carriage 400 and the guide posts 200 allows for an operation carried out manually or by a driving mechanism that moves the upper slidable carriage 400 in the vertical direction for downward depression. During the downward depression, as shown in FIG. 8, free ends of the positioning bars 520 are first inserted into the positioning holes 620 of the lower mold 600 to effect guidance of further movement of the terminal depression slide 700. The depression engagement section 710 of the terminal depression slide 700 is then brought into engagement with the conductive terminals 22. With the downward movement of the upper slidable carriage 400, the terminal depression slide 700 depresses the conductive terminals 22 down deeply into the insulation housing 21, making front ends of the conductive terminals 22 engaging and holding the cover the pivots 26. When the downward depression of the conductive terminals 22 by the terminal depression slide 700 is carried out to such an extent to just engage the pivots 26 of the cover 23, the positioning blocks 530 on the opposite side portions of the upper mold 500 are in contact with the lower mold 600, stopping further downward depression of the terminal depression slide 700 and thus protecting the FPC connector 20 from damage caused by excessive depression.

Once the assembling of the terminals completed, the fasteners engaging the mounting slot 560 are released to allow the lower slidable carriage 300 and the lower mold 600 to be removed and transported together to the next, retainer assembling operation station, where assembling of retainers is carried out. The assembling operation of the retainers 28 is substantially identical to that of the conductive terminals 22, where the retainers 28 are first placed into the slots 29, and downward movement of the slidable block is performed to drive the retainer fitting mechanism to depress the retainers 28 into the slots 29 for secured engagement with the slots 29.

In summary, in assembling an FPC connector with the FPC connector assembling fixture 10 according to the present invention, the insulation housing 21 is securely set in the accommodation chamber 610, the cover 23 is caused to slide through the first slide channel 820 into the second slide channel 830, the push rod 810 conveys the cover 23 into the accommodation chamber 610 to be assembled to the insulation housing 21, the terminal depression slide 700 moves downward in a depression direction that is substantially normal to the conveying direction in which the push rod 810 conveys the cover 23, keeps the cover 23 in an open condition to allow the conductive terminals 22 to be successively fit into the insulation housing 21, and then the terminal depression slide 700 is set in alignment with the conductive terminals 22 for forcing the terminals 22 deeply into the insulation housing 21 to have ends of the terminals 22 engage and hold the pivots 26 of the cover 23, thereby completing stable and reliable assembling of the FPC connector 20. The FPC connector assembling fixture according to the present invention helps improving operation efficiency and reducing labor costs. Meanwhile, the products assembled in this way show consistent quality and high precision, and the assembling between the connector body and the cover is stable and reliable. Thus, the FPC connector assembling fixture according to the present invention increases operation efficiency and reduces labor cost. And, the products so assembled show consistent quality and improved passing rate.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An FPC (Flexible Printed Circuit) connector assembling fixture, which is adapted to assemble a cover, conductive terminals, and an insulation housing of an FPC connector, the fixture comprising:

a base, which is set horizontally;

a lower slidable carriage, which is slidably coupled to the base;

a lower mold, which is rotatably coupled to the lower slidable carriage, the lower mold forming an accommodation chamber, in which the insulation housing is received and retained;

an upper slidable carriage, which is located above the base and opposes the lower slidable carriage in a vertical direction;

an upper mold, which is mounted in the vertical direction to a bottom of the upper slidable carriage;

guide posts, which have lower ends mounted to the base and opposite upper ends slidably extending through the upper slidable carriage;

a terminal fitting mechanism, which is mounted to the upper mold in a slidable manner; and a cover mounting mechanism, which is mounted to the lower mold, the cover mounting mechanism comprising a push rod and a first slide channel and a second slide channel formed in the lower mold, the first slide channel and the second slide channel being respectively formed in substantially perpendicular directions, the second slide channel being in communication with the accommodation chamber and the first slide channel, the push rod being in engagement with and slidably coupled to the second slide channel, the push rod being slidable in a direction that is substantially perpendicular to a sliding direction of the terminal fitting mechanism.

2. The FPC connector assembling fixture as claimed in claim 1, wherein the push rod has an end opposing the insulation housing received in the accommodation chamber, the end forming a holding slot substantially located on the same plane as the first slide channel, whereby the cover is slidable through the first slide channel into the holding slot to be retained therein in such a way that an end of the cover projects outside the push rod.

3. The FPC connector assembling fixture as claimed in claim 1, wherein the push rod forms a first groove in a bottom close to said end thereof, the first groove having a side wall that is adjacent to the accommodation chamber and forms a slanted surface, the second slide channel forming a circular recess in a bottom thereof, the circular recess having an opening receiving and retaining a positioning sphere, whereby the first groove is engageable with the positioning sphere.

4. The FPC connector assembling fixture as claimed in claim 1, wherein the push rod has a side wall forming a second groove, the lower mold comprising a first retention board that has an end mounted to the lower mold and an opposite end extending into the second slide channel and engageable with the second groove of the push rod.

5. The FPC connector assembling fixture as claimed in claim 1, wherein the lower mold comprises a second retention board, which has an end mounted to the lower mold and an opposite end extending above the second slide channel to engage an upper surface of the push rod received in the second slide channel.

6. The FPC connector assembling fixture as claimed in claim 1, wherein the lower slidable carriage forms a third slide channel that engages and mates the lower mold, so that the lower mold is slidably coupled to the third slide channel, the lower slidable carriage comprises a stop block fixed to an end of the third slide channel, whereby a leading end of the lower mold in a sliding direction is engageable with the stop block.

7. The FPC connector assembling fixture as claimed in claim 1, wherein the upper mold forms a reference surface opposing the lower mold, the upper mold forming positioning bars, positioning blocks, and a fourth slide channel, each of the positioning blocks having an end fixed to the upper mold and an opposite end projecting beyond the reference surface for being engageable with the lower mold, the fourth slide channel being formed in a direction substantially perpendicular to a plane on which the base is set, the terminal fitting mechanism having an end slidably coupled to the fourth slide channel and an opposite end projecting beyond the reference surface and located exactly above the conductive terminals of the insulation housing received in the accommodation chamber, the positioning bars projecting beyond the reference surface and respectively located between the terminal fitting mechanism and the positioning blocks, the positioning bars having a projection length that is greater than a distance the positioning blocks project beyond the reference surface, the lower mold forming positioning holes corresponding to the positioning bars, the positioning bars being respectively extendable into the positioning holes.

8. The FPC connector assembling fixture as claimed in claim 7, wherein the terminal fitting mechanism comprises a terminal depression slide, which has a leading end in a downward sliding/depression direction the terminal depression slide forming a depression engagement section corresponding to the conductive terminals projecting from the insulation housing.

9. The FPC connector assembling fixture as claimed in claim 1, wherein the insulation housing forms slots, the FPC connector comprising retainers, the FPC connector assembling fixture comprising a retainer fitting mechanism mounted to the base, the retainer fitting mechanism being set along the same line as the terminal fitting mechanism.

10. The FPC connector assembling fixture as claimed in claim 9, wherein the base forms a fifth slide channel along the line of the terminal fitting mechanism and the retainer fitting mechanism, the lower slidable carriage having a bottom forming a slidable rib engageable with the fifth slide channel, the slide rib being slidably coupled to the fifth slide channel.

11. The FPC connector assembling fixture as claimed in claim 10, wherein the slide rib formed on the bottom of the lower slidable carriage defines mounting holes, the fifth slide channel forms, in portions thereof respectively corresponding to the terminal fitting mechanism and the retainer fitting mechanism, mounting slots corresponding to the mounting holes.

* * * * *